United States Patent [19]

Hoyt

[11] 4,053,024
[45] Oct. 11, 1977

[54] LIGHT ITEM PORTABLE SCALE

[76] Inventor: Myron S. Hoyt, 98 Hawthorne Drive, N.1-M, New London, Conn. 06320

[21] Appl. No.: 711,393

[22] Filed: Aug. 3, 1976

[51] Int. Cl.$^2$ .................... G01G 3/00; G01G 21/00; G01G 19/56
[52] U.S. Cl. .................................. 177/225; 177/126; 177/148
[58] Field of Search ............... 177/126, 127, 148, 149, 177/225, 234, 264

[56] References Cited

U.S. PATENT DOCUMENTS

| | | | |
|---|---|---|---|
| 336,275 | 2/1886 | Willson | 177/126 X |
| 1,578,137 | 3/1926 | Kaplan | 177/225 |
| 2,697,595 | 12/1954 | Walter | 177/126 |
| 2,827,277 | 3/1958 | Dieter | 177/264 |

*Primary Examiner*—George H. Miller, Jr.

[57] ABSTRACT

A scale for weighing light items, such as letters, to ascertain the correct amount of postage to be applied to the letters. The scale includes a substantially planar flexible strip having a proximate and distal end. The proximate end includes a scale calibrated in weight units, while the distal end includes a vertical resilient strip for holding a letter formed by cutting an inverted U-shaped slot in the strip and a horizontal slot. The proximate end of the strip including the scale is bent back upon itself and passed through the horizontal slot. The distal end can then move under the weight of the letter relative to the proximate end to indicate the weight of the letter on the scale.

5 Claims, 4 Drawing Figures

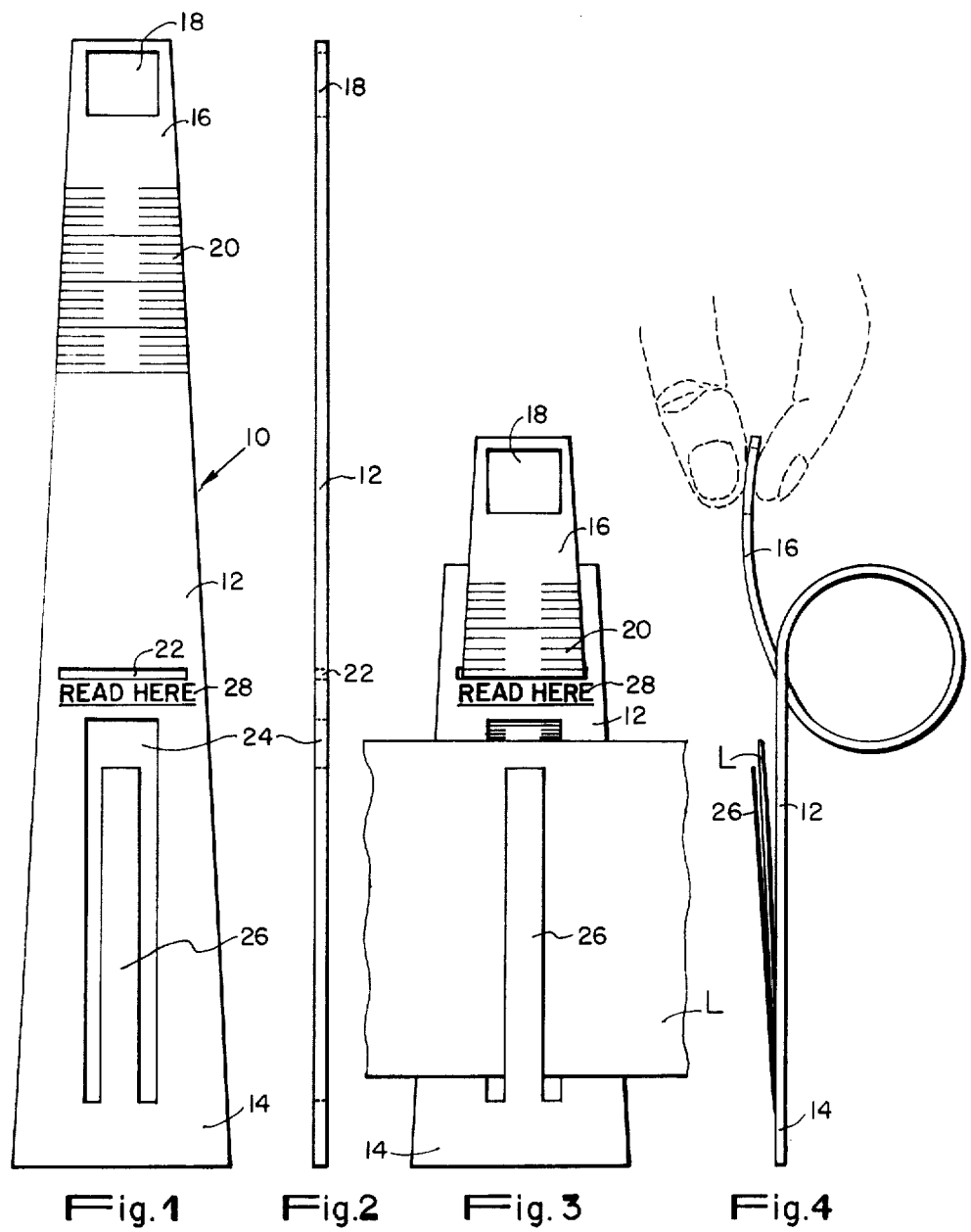

LIGHT ITEM PORTABLE SCALE

BACKGROUND OF THE INVENTION

This invention relates to a portable scale for use in weighing light items such as letters in order to compute the correct amount of postage required to mail the letters.

Time and again extra stamps are attached to a letter just to be sure that the postage affixed to the letter is sufficient. Frequently, letters are returned for insufficient postage. In either event, it would be convenient to have a compact, portable scale readily available before mailing the letter in order to be able to ascertain the correct amount of postage required for mailing the letter, particularly since postage rates have become increasingly expensive. Heavy metal scales which find widespread use for this purpose are complex and expensive and do not suit the needs of an infrequent user.

SUMMARY OF THE INVENTION

Accordingly, this invention provides an inexpensive, portable scale which may be conveniently stored in a desk drawer or the like and includes a substantially planar strip of material having a finger hole and a calibrated scale at a proximate end and a horizontal and vertical slot including an integral and resilient letter retaining element. A letter to be weighed is inserted across the vertical slot and held against the planar surface of the strip by the retainer. The strip is then bent back upon itself and the proximate end including the scale and finger hole inserted through the horizontal slot with the "0" weight reading on the scale positioned at a reference line. Holding the strip by the finger hole, the weight of the letter will then move the strip downwardly by gravity to indicate the weight of the letter on the scale.

BRIEF DESCRIPTION OF THE DRAWING

Further objects and advantages of the invention will become apparent from the following description and claims, and from the accompanying drawing, wherein:

FIG. 1 is a front view in elevation of the scale of the present invention;

FIG. 2 is a side view in elevation of the scale of FIG. 1;

FIG. 3 is a front view in elevation of the scale of FIG. 1 in use in weighing a letter; and FIG. 4 is a side view in elevation of the scale of FIG. 3.

DETAILED DESCRIPTION OF THE PREFERRED EMBODIMENT

Referring now in detail to the drawing, wherein like numerals indicate like elements throughout the several views, the scale 10 of the present invention includes a substantially planar strip 12 of flexible plastic or metal whose opposite edges taper from a distal end 14 to a proximate end 16 for a purpose to be described hereinafter.

The proximate end 16 of strip 12 includes a finger hole 18 and a scale 20 calibrated in both ounces and grams as will be evident from the description below. The distal end 14 of strip 12 includes a horizontal slot 22 whose width is wider than a substantial portion of the proximate end 16 of strip 12. A vertical slot 24 is cut in the distal end 14 in an inverted U-shaped pattern to provide a resilient vertical strip or retainer 26 in the center of slot 24.

In use, a letter L to be weighed is inserted across vertical slot 24 and held against the planar surface of strip 12 by the resilient retainer 26. The strip 12 is then bent back upon itself and the proximate end 16 including scale 20 and finger hole 18 inserted through the horizontal slot 22 with the "0" weight reading on scale 20 positioned at a reference line defined by the bottom of slot 22. Suitable indicia 28, such as "READ HERE" is printed just below the bottom of the slot 22. Holding the strip 12 by the finger hole 18, or if too small, between the thumb and forefinger, the weight of the letter L will move the distal end 14 of strip 12 downwardly relative to proximate end 16 by gravity to indicate the weight of the letter L on scale 20 read by the bottom line of slot 22.

Scale 20 is calibrated by attaching letters of higher known weight progressively behind retainer 26, starting at the reference "0". Because of the tapering side edges of strip 12, the smaller proximate end 16 will easily slide through oversized slot 22 under the weight of letter L. If desired, advertising, postal rates, etc., may be printed between the end of scale 20 and the top of slot 22. Finally, the strip 12 may be appropriately colored for visibility and attractiveness.

I claim:

1. A portable scale for weighing light items comprising:
   a substantially planar flexible strip of material having a proximate end and a distal end,
   a scale adjacent said proximate end calibrated in units of weight,
   a horizontal slot adjacent said distal end for receiving the proximate end of said strip bent back upon itself therethrough including said scale; and
   means connected to the distal end of said strip for retaining an item to be weighed,
   whereby the distal end of said strip can move under the weight of said item relative to said proximate end and said scale to indicate on said scale the weight of said item.

2. A scale in accordance with claim 1 wherein said retaining means includes a resilient vertical strip of material formed by an inverted U-shaped slot cut in distal end of said strip.

3. A scale in accordance with claim 1 wherein the lateral opposed edges of said planar strip taper from said distal to proximate end, and a substantial portion of the width of said proximate end is narrower than the width of said horizontal slot.

4. A scale in accordance with claim 1 including a fingerreceiving opening in said proximate end.

5. A scale in accordance with claim 1 wherein the bottom of said horizontal slot provides a reference line for reading said scale.

* * * * *